Feb. 12, 1952 V. E. MURRAY 2,585,028
PASSENGER CAR TYPE TWO-SPEED AXLE
Filed June 4, 1949
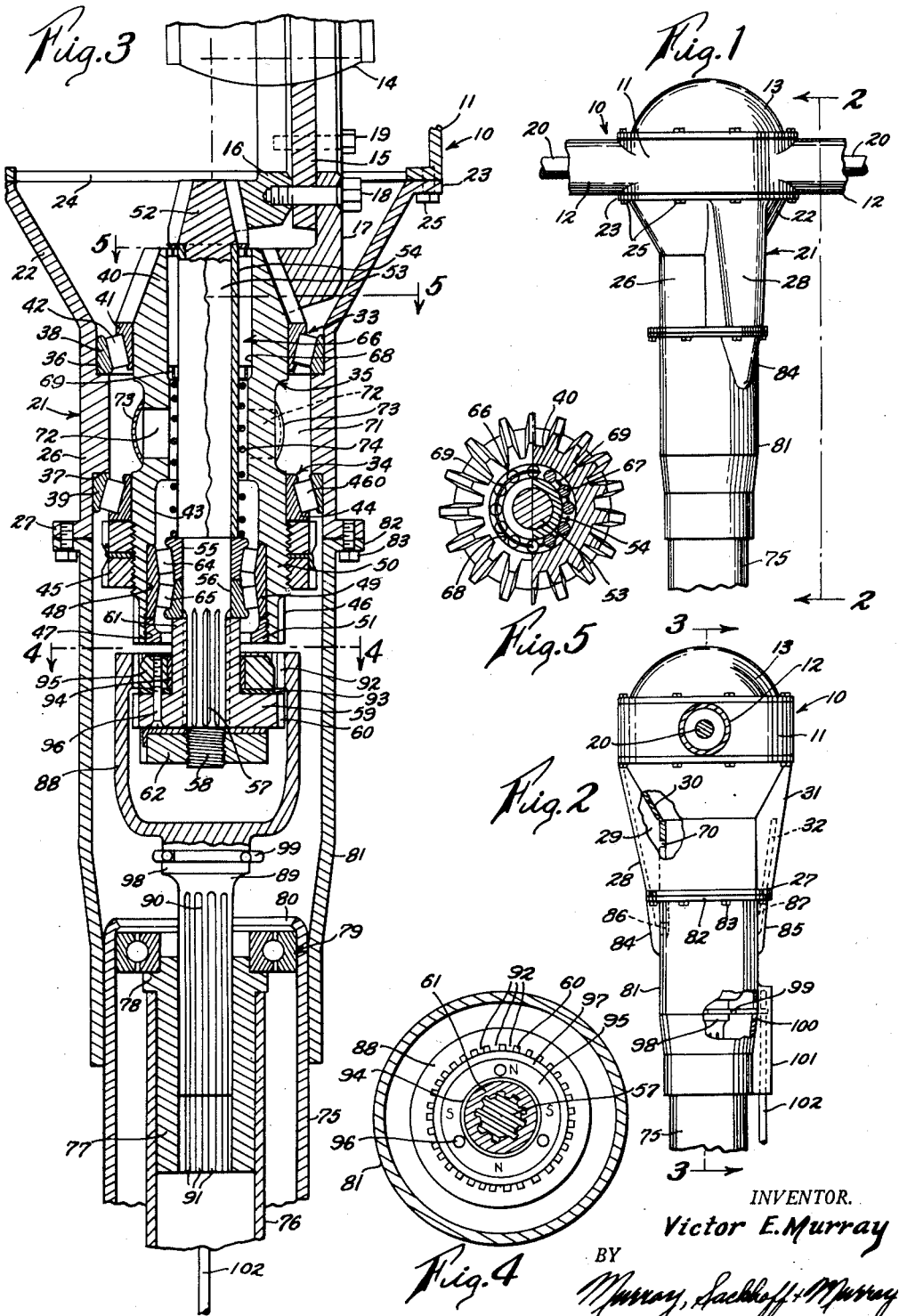
INVENTOR.
Victor E. Murray
BY
Murray, Sackhoff & Murray
ATT'YS Patented Feb. 12, 1952

2,585,028

UNITED STATES PATENT OFFICE 2,585,028

PASSENGER CAR TYPE TWO-SPEED AXLE

Victor E. Murray, Cincinnati, Ohio, assignor of sixty per cent to Charles H. Reedy, Cincinnati, Ohio Application June 4, 1949, Serial No. 97,158

10 Claims. (Cl. 74—700)

The present invention relates to two speed axles of the passenger car type and has for an object the provision of a device of this type which includes simple and economically produced structure, wherein the arrangement of parts overcomes the difficulties that have rendered previous known and proposed devices unsuited for practical use in modern passenger cars.

Another object of this invention is to provide an arrangement of critically interrelated parts whereby the device is readily constructed, with respect to size, weight, and the capacity for the duty required of it, for practical use in modern passenger cars by the use of approved production methods and safety standards in the industry.

Still another object of the invention is to provide a device of the character referred to which obviates all of the limitations that have heretofore excluded the proposed and theoretical approved two speed axles of the passenger car type from practical use in the modern passenger car.

A still further object of the invention is to provide a device of this character, in which simplicity in manufacture, adjustment, and assembly, and the removal of limitations on the gear and pinion sets, has made possible the employment of a radically increased spread between the gear ratios of the high speed and low speed gear sets and a vital improvement in the efficiency and operating control of passenger cars embodying the same.

A still further object of the invention is to provide a device of this kind with a simple, inexpensive and compact means for synchronizing the sliding clutch member with respect to the low speed pinion shaft in shifting from high speed to low speed gear in the device.

These and other objects are attained by the means described herein and exemplified in the accompanying drawings in which:

Fig. 1 is a fragmental top plan view of a rear axle and torque tube of a passenger car having a device of the invention operatively mounted thereon.

Fig. 2 is a view taken on line 2—2 of Fig. 1.

Fig. 3 is a cross sectional view taken on line 3—3 of Fig. 2.

Fig. 4 is a cross sectional view taken on line 4—4 of Fig. 3.

Fig. 5 is a cross sectional view taken on line 5—5 of Fig. 3.

Two speed axles of the passenger car type have been universally approved in theory and were used in at least one instance in passenger cars of the old type which had considerably more road clearance and much lower road speeds than the present day passenger cars.

The increased speed of the modern passenger vehicle has required a lowered center of gravity and a reduction of the road clearance to a degree that has made it impossible in practice to utilize devices as heretofore known and proposed in the more modern high speed cars.

Because of the acceptance in theory, two speed axles have been proposed for modern cars from time to time involving costly and complicated construction and assembly. Such proposed devices have been rejected for practical adoption in the industry due to the fact that the critical interrelation of parts to each other and to the limitations in size and unsprung weight in the modern vehicle have made it impossible for the automotive engineers to scale such devices to meet the approved standards in the industry. One of the most troublesome factors in attempting to adopt the proposed devices to acceptable practical standards has been that of adequately providing for end thrust on two beveled pinions while maintaining all of the other interrelated factors within the limitations of size, weight, cost and safety factors.

The present invention eliminates these difficulties by resort to a novel arrangement of commercially available bearings which removes to a material degree the limitations with respect to the selection of the gear and pinion sets and the effective disposition thereof.

The new two speed axle transmission of the invention has thus not only adapted this type of axle for use in modern passenger cars in the sense heretofore proposed but in addition it has made possible an improved efficiency and ease of operation in the vehicle embodying the same. The improvement consists in replacing the universally employed compromise ratio gear set with a low speed gear set that will permit the vehicle to be driven in the so-called "direct drive condition" at all speeds from say start to thirty M. P. H. Hence the vehicle may be started and operated under all traffic or city driving conditions without use of the change speed gear lever and solely under the control of the engine throttle. In this way the torque delivery to the road wheels is at all times under the most efficient operating conditions of the engine. The high speed gear set is selected with ample latitude to adapt it for open highway use. Thus a vehicle so equipped has all of the advantages of ease operation by throttle control that are found in the more expensive and less efficient fluid drive devices for passenger cars for operating in traffic and also has the advantages of the modern so-called overdrive system for use on open rolling highways. Where the device of the invention is embodied in an existing passenger car the usual gear shift transmission is uniformly left in "high" gear save in emergency or backing the vehicle. The gear shift transmission is thus susceptible of obvious simplification, eliminating the plurality of forward speeds and correspondingly reducing its cost in vehicles designed with the two speed axle of the present invention as standard construction.

Referring now to the drawings, the conventional axle housing 10 has a center housing 11 and axle tubes 12 extending therefrom. The rear opening in the center housing is closed by a suitably attached cover plate 13. The usual differential 14 has a flange 15 to the opposite faces of which are attached a low speed bevel ring gear 16 and a high speed bevel ring gear 17, attached by individual series of bolts 18 and 19. The axle shafts 20 are connected in known manner with the differential 14.

The carrier housing indicated generally at 21 is a one piece member with a flared rearwardly portion 22 terminating in a circular flange 23 that seats over the forward opening 24 of center housing 11. The carrier housing is connected to the center housing by bolts 25 and the projecting bevel ring gears 16 and 17 are thus enclosed. Carrier housing 21 has a cylindrical forward end portion 26 with a bolting flange 27. Carrier housing 21 has an upper integral enlargement 28 extending longitudinally between flanges 23 and 27 located to one side of top center. A tapered oil passage 29 is formed entirely through the length of the longitudinal boss or enlargement 28 and the flange 27 at the forward end and is in open communication at its rear end with the interior of flared portion 22 so that oil contained as a pool in center housing 11 is continually thrown forcibly into the open rear end of said oil passage by the bevel ring gear 17 and flows forwardly through the entire length of said passage. An integral upstanding dam 30 in the rear end of passage 29 prevents draining of oil back into the center housing when the vehicle is at rest on an upgrade.

On the bottom of carrier housing 21 is another longitudinal boss 31 directly below the upper boss 28. An independent return oil passage 32 extends through boss 31 and its forward flange 27 and communicates with the bottom interior of the flared portion 22.

Commercially available bearings 33 and 34 are mounted in the opposite ends of cylindrical portion 26 of carrier 21 and in opposed longitudinally spaced relation. Said bearings are of ample size for the intended duty and are of the angle roller bearings type and together serve to support a tubular high speed pinion shaft 35 for radial and for end thrust in both directions. The arrangement shown and described affords a simple and economically machined and assembled construction that is especially adapted to modern automotive production methods and safety standards.

Adjacent opposite ends of cylindrical portion 26 are internal annular shoulders 36 and 37 on which are seated the oppositely tapered outer races 38 and 39 respectively of the roller bearings 33 and 34. Tubular shaft 35 has an integral and overhanging high speed pinion 40 on its rear end and the inner race 41 of bearing 33 is pressed onto the said shaft in abutment with the overhanging base of the pinion. The high speed gear set 17—40 as manufactured by modern methods has the longitudinal adjustment of pinion 40 established with relation to the axial center line of gear 17. Hence, if a very slight adjustment is required initially to assure smooth, quiet, meshing engagement between the beveled ring gear 17 and the bevel gear 40, such adjustment is effected either by interposing a thin shim (not shown) between the overhanging base of pinion 40 and the inner bearing race 41, or by grinding slightly the face of race 41.

The interposed rollers 42 serve to transmit end thrust in a forwardly direction to the shoulder 36 of the carrier 21.

High speed pinion 40 thus overhangs the rear roller bearing 33 and requires no outboard bearing to retain it in proper meshed engagement with the large or high speed ring gear 17.

The forward end of the tubular shaft has an enlarged stepped counterbore 43 therein and said shaft is externally adapted to receive the inner race 44 of bearing 34. The shaft is threaded for a distance forwardly of race 44 to receive lock nuts 45 which are used to shift the race 44 to engage the rollers 460 and thus simultaneously position the inner faces of both bearings 33 and 34.

The lock nut structure 45—45 is secured when adjustment of the rearwardly nut of said pair has adjusted the inner races to a position wherein the tube shaft 35 is smooth and free running in its bearings.

At its extreme forward end the tube shaft 35 has an external circumferential series of clutch teeth 46. The internal circumference of the stepped counterbore 43 is threaded for a distance from its end rearwardly at 47 and then has a slightly reduced, smooth counterbore 48 for receiving the unitary outer race 49 of a double opposed angle roller thrust bearing, said race 49 being adapted to be moved into positive abutment with an annular shoulder 50 in said counterbore 43. An externally threaded ring nut 51 is adapted to be threaded into the threaded counterbore 43 for the purpose of positively locking the race 49 in position.

A low speed bevel pinion 52 is formed integrally on the end of an elongated shaft 53 which has a surface hardened and ground sleeve 54 fixed thereon as by freezing or drive fit. The sleeve 54 abuts the overhanging base of pinion 52 and strengthens the shaft at that point and also conceals any incidental cutter marks that may have marred the surface of the shaft at the base of the pinion. The forward end of the tube or sleeve 54 forms a shoulder against which an inner race 55 of the double angle bearing is abutted. An angularly opposed inner bearing race 56 is mounted on the shaft in abutment with the race 55. Forwardly of the race 56 the pinion shaft 53 is provided with splines 57 for a distance and the terminal end portion of said shaft is threaded as at 58. A low speed clutch member 59 has an external circumferential series of clutch teeth 60 of a form identical with the teeth 46 on the tubular shaft 45. An integral sleeve 61 on clutch member 59 is internally splined complementarily to the spline portion 57 of shaft 53. Said sleeve is adapted to abut the inner bearing race 56 and may be adjusted rearwardly by means of a lock nut 62 for rigidly clamping the races 55 and 56 between the end of sleeve 54 on said shaft and sleeve 61 on the clutch member. The assembly of these parts is simple and rapid, the initial longitudinal adjustment of shaft 53 relative to the tube shaft 35 being made by metal removal at the abutting faces of sleeve 54 and inner race 55 or by the insertion of shims (not shown) between the abutting ends of said members. The longitudinal adjustment having been established to secure smooth, quiet, meshing operation of pinion 52 on low speed ring gear 16, the assembly is merely tightened as securely as possible by drawing up nut 62 whereupon there is established adequate provision for end thrust in both directions without further adjustment, the provision for smooth running end play is established between the respective series of rollers 64 and 65 and the single outer race. Thus the utilization of commercially available taper roller bearings as shown merely requires that such a bearing be drawn up tightly in the simple assembly as shown.

It will be observed that the entire assembly is greatly simplified by the fact that the ends of shafts 35 and 53 project slightly beyond the forward flanged end of cylindrical portion 26 of carrier casing 21. It will be observed that the two opposed angle roller bearings within the outer race 49 will take the radial thrust of the forward end of shaft 53 on the forward end of tube shaft 35 closely adjacent the thrust bearing 34 of said tube shaft, and these two angle roller bearings will provide adequately for all end thrust on pinion shaft 53 in both directions.

Provision for radial thrust at the rear end of shaft 53 on tube shaft 35 is arranged in the following manner. A cage type journal roller bearing 66 has the spaced rollers 67 contacting the inner circumference of the slightly enlarged counterbore 68 in pinion 40 and the outer circumference of the hardened and ground sleeve 54. The retaining cage 69 of bearing 66 is relatively free floating in the space, the overall length of the cage being sufficiently reduced so that its opposite ends may not simultaneously contact the overhanging base of pinion 52 and the shoulder formed by the counterbore 68.

Automatic continuous lubrication is provided during operation for the several bearings in the manner now to be described. Oil is centrifugally thrown onto the ends of pinions 40 and 52 by operation of the ring gears 16 and 17 so that the rear ends of bearings 33 and 66 are amply supplied directly with lubricant from the center housing 11. The oil is also thrown forcibly over the top of dam 30 and through passage 29. The oil passage 29 has an aperture 70 communicating with the annular space 71 between bearings 33 and 34 so that this space is filled with oil during operation. Tubular shaft 35 has several openings 72 therethrough leading into the hollow interior of the tube shaft and has hoodlike scoops 73 mounted over said openings with the open front of each scoop moving through the oil in the annular space 71 and forcing it in ample volume into the hollow interior of the shaft. A snugly fitting helical wire oil impeller 74 surrounds the sleeve or collar 54 on low speed pinion shaft 53 and serves to move oil forwardly so that the entire stepped counterbore 43 is kept in an oil filled condition and the double angle roller bearing unit within the unitary outer race 49 is supplied with oil which escapes from the open front end of the tube shaft 35.

From the foregoing it will be noted commercially available roller bearings of adequate size are arranged to support the shafts of ample proportions in an easily assembled relation and within a minimum size of carrier housing. The assembly is thus provided for safe and efficient operation using a minimum of space and unsprung weight. Under such conditions only can the two speed axle of the passenger car type be adapted to the modern passenger vehicles.

Reference is now made to Figs. 2, 3 and 4 of the drawings for the disclosure of the simple and easily operated means for selectively driving pinions 40 and 52 from the propeller shaft of a vehicle embodying the invention. The existing propeller shaft housing 75 of the vehicle houses the propeller shaft 76 from which power is to be transmitted to the pinion shaft. The end of the shaft 76 has fixed therein an internally splined sleeve 77 provided at its rear end with a shoulder forming projection 78 which seats the inner race of a ball bearing 79, the outer race of which fits into the housing 75 and has the end edge 80 thereof peened over it for holding the parts in assembled condition.

A tubular clutch casing 81 is fixedly connected to the propeller shaft housing 75 by a pressed telescoping fit with additional brazing or welding (not shown). Casing 81 has an extended bolting flange 82 at its rear end adapted to be secured to the flange 27 of the carrier housing 21 by a series of cap screws 83. Casing 81 has projections 84 and 85 at its top and bottom with hollow passages 86 and 87 adapted for communication with passages 29 and 32 respectively in the carrier housing 21. The passages 86 and 87 each communicate with the interior of the clutch casing 81 and assure the presence of an ample volume of circulating oil in said casing.

A cup-shaped sliding clutch member 88 has a stub shaft 89 projecting from its forward end into the splined sleeve 77 in the propeller shaft, the stub shaft having a series of upstanding splines 90 slidably meshing with the splines 91 in sleeve 77.

At its rear end the sliding clutch member 88 has an annular series of internal circumferential teeth 92 that are adapted to be selectively meshed with the external circumferential clutch teeth 46 and 60 on the high speed pinion shaft and low speed pinion shaft respectively as the member 88 is shifted from one to the other through the intervening neutral space.

It will be understood that the clutch member 88 is at all times rotatable with the propeller shaft 76 which is adapted in known manner to be disconnected from its driven connection with the engine when desired, so that the pinion shafts, clutch member 88 and propeller shaft may turn under the influence of axle rods 20 of the moving vehicle until the teeth 92 are shifted momentarily free of the clutch teeth of both said pinion shafts. It is customary to allow an ensuing interval, in which a sliding clutch and its propeller shaft are free turning as a unit, before attempting to mesh the sliding element with a cooperating clutch element so that noise and danger of damage are minimized. In the present invention the low speed clutch element is equipped with a simple, inexpensive and compact multipolar, permanent magnetic synchronizer which exerts a beneficial accelerating influence on the free turning clutch 88 and propeller shaft 76 which becomes increasingly effective as the sliding clutch teeth 92 are withdrawn from high speed pinion clutch teeth 46 into the neutral space and approach the teeth of low speed clutch element 59. In this way the shifting interval is capable of being reduced in time and the danger of clash or breakage of clutch teeth is minimized.

The permanent magnetic synchronizer is arranged as follows. A non-magnetic washer 93 is placed over the tubular extension 61 of low speed clutch element 59 and into abutment with the face of the latter. A short non-magnetic sleeve 94 is then pressed over the extension 61 and into abutment with washer 93. A permanent magnetic ring 95 is snugly pressed onto the non-magnetic sleeve 94 and one face of ring 95 is abutted against the adjacent face of the washer 93. A plurality of non-magnetic screws 96 (or rivets) serve to hold the clutch element 59, washer 93 and the magnetic ring 95 together as a unit. Ring 95 has a pair of diametrically opposed north poles indicated at N and at 90° thereto a pair of diametrically opposed south poles indicated at S. These permanent and magnetically opposite poles alternate about the circumference of ring 95. The ring 95 has a beveled face 97 so that the poles N and S exert a progressively increasing magnetic attraction on internal circumferential teeth 92 of the sliding clutch as said teeth move out of full meshing engagement with the clutch teeth 46 on the high speed shaft and over the beveled face 97 of the magnetic ring. The factor of diminishing radial distance between the steel teeth of the sliding clutch and the beveled face of the several poles immediately increases the magnetic attraction to the optimum as teeth 92 move free of teeth 46 and fully into the neutral position between the clutches. The true cylindrical portion of the multipolar magnet ring has a minimum practical clearance with teeth 92 over the greater portion of the length of the teeth at this time, and the then free turning sliding clutch and propeller shaft tend to assume the same speed of rotation in a shorter period of time due to the synchronizing effect of the multipolar permanent magnet. As shown in Fig. 4 the teeth 92 are shallow and numerous. As each of these teeth pass each of the magnetically opposite poles a strong momentary magnetic attraction occurs. The cumulative effect is that of remarkably rapid synchronization of the speed of the propeller shaft and the sliding clutch with that of the low speed clutch element. It is well known that in shifting a clutch arrangement of this kind, the greater difficulty is in shifting from a high speed engagement to a lower one, and hence the present device, which is compact and inexpensive, eliminates the difficulty in that respect. In shifting from low axle speed transmission to high speed the magnetic attractive force decreases rapidly as the sliding clutch teeth enter the high speed clutch element from a neutral position.

The shifting of sliding clutch element 88 is effected by any suitable means. Preferably the clutch element 88 has an annular grooved collar 98 in which the shifter yoke 99 engages. The yoke 99 passes through a slot 100 in the bottom of clutch casing 81, which slot opens into the hollow interior of an integral guide boss 101 in which the shifter rod 102 is reciprocably guided. The end of the yoke is threadedly engaged on the shifter rod.

From the foregoing it will be observed that the parts are all economically produced and assembled in a minimum of time by modern production methods. Tedious and time consuming adjustments are totally eliminated. There are no major modifications of the passenger car chassis involved in adapting the invention to any particular make or model either as an optional axle transmission or as a standard construction for a new model car with a two speed axle. The elimination of the heretofore universally employed "compromise" ratio in the gear sets and the employment of the two gear sets with a wide spread between their respective ratios results in the provision of two direct drive gear ratios individually suited to the two general operational situations involved in the use of the modern high speed passenger cars. The low axle speed ratio for the gear 16 and pinion 52 may be 6.14 to 1 while the ratio of the gear 17 and pinion 40 may be 3.23 to 1. Such a spread of the gear ratios has been found to provide a low "direct" drive for traffic, hill climbing and acceleration up to say thirty or more M. P. H. with the engine operating at its greatest efficiency with the road speeds determined by the engine speeds under the control of the throttle. The large or high speed gear set 40—17 is utilized for high speed travel on open rolling highways without resorting to excessive engine speeds.

Thus the device of the invention successfully overcomes the obstacles to the use of passenger car types of two speed axles in the modern vehicle, but it has provided an actual increase in the torque delivery to the road wheels and a new and simplified operating control without resort to any of the more expensive torque converters, underdrives, overdrives and other mechanisms of more recent type for simplifying passenger car operation.

The device as hereinbefore shown and described utilizes an unique and interrelated combination of bearings in a space saving arrangement which makes possible the use of adequate proportions of shafts, pinions, bearings, and ring gears within the critically limited available space. The use of a cage-type roller journal bearing with the inside of the large pinion as its outer race and the hardened sleeve on the small shaft as its inner race conserves space that permits the use of ample sized pinions for a wide spread in ratio for high and low gear sets. This in turn permits the use of ring gears that are of the required ratio without appreciably increasing the diameter, hence the center housing of the axle need not be appreciably enlarged, nor is road clearance greatly reduced.

The selection of gear ratios is thus liberalized and a spread of up to around 100% between the ratios may be employed as compared with about 20% as heretofore proposed for two-speed axles which were furthermore impractical for actual use.

The "compromise" ratio that was heretofore universally used in conventional passenger car axles and indicated in the impractical proposed two-speed axles is completely eliminated. Instead the ratios of both gear sets are selected to suit direct engine to propeller shaft connection for two different power ranges one for hills, for acceleration and city driving (e. g. up to 35 M. P. H.) and the other for open rolling highway speed of from about 35 M. P. H. upwardly to a practical limit. In each power range the gear ratio of the related gear set in the axle utilizes a constant rate of engine turn over per mile of vehicle travel at which the engine develops approximately its highest torque and delivers the same to the road wheels. Speed control of the vehicle is by the engine throttle and shifting of the axle transmission by any convenient means located near the driver is indicated only when moving from a hilly or an urban area where speed limits do not exceed 35 M. P. H., to an open country where the speed limit is higher. The operator is not precluded from travel, in low axle transmission, at speeds above 35 M. P. H. if necessary for emergency speeds in city driving. He merely sacrifices economy of operation during such brief intervals. Nor is he precluded from driving slower than 35 M. P. H. in higher axle transmission if required by circumstance.

The existing lever gear shift of the vehicle is placed in "high" or direct position for all forward speeds and requires no attention when shifting the sliding clutch of the two speed axle transmission. First or "low" engine gear is employed only in pulling out of soft mud, or starting on a very steep hill or other emergency operations. The intermediate position of the engine transmission may be consistently ignored in the control and operation of a vehicle embodying the invention.

The inexpensive multipolar permanent magnetic synchronizer makes it possible to shift from high to low axle gear sets in a rapid and easy manner without reducing the road speed of the vehicle to any great degree and it is thus made entirely practical to utilize the wide ratio spread between the axle gear sets.

The car performance is thus at approximately the optimum in all respects for traffic, hilly country or level country driving. The control of the vehicle is greatly simplified and the economies of low fuel and lubricnat are attained with an accompanying great reduction of wear on the engine and associated parts.

The use of torque converters, fluid drives, and overdrives is unnecessary to attain the advantages of all of these modern contrivances that are used at present only in higher priced modern passenger cars. The low cost two-speed axle of the invention provides all of the advantages with greater efficiency and without the known difficulties of the aforementioned contrivances. It is moreover readily adaptable to all makes and models of modern passenger and like vehicles without change of specification save as indicated in the two-speed axle substantially as shown. For this reason it is deemed unnecessary to further illustrate the details of a modern motor vehicle. It may be noted however that for new models of any make of car in which the present invention is made standard construction it is feasible to simplify and cheapen the gear shift transmission by providing only for "first" and "high" forward positions along with neutral and reverse positions.

The compact multipolar permanent magnetic synchronizer will be understood to be of general utility in facilitating the shifting of clutches, gears and like mechanism, particularly in devices that are relatively difficult of access. There are no mechanical friction elements to become worn or require adjustment. The size of the ring having a plurality of permanent magnetic poles is relatively small and the ring cooperates directly with the teeth of the sliding clutch element. Where the necessity for compactness is absent, and the free spinning member is heavier, the mutually affected parts may be made larger, or may be duplicated if desired.

What is claimed is:

1. In a passenger car the combination of a two speed axle of the passenger car type including a high and a low speed axle transmission gear set, each gear set including a beveled ring gear and a beveled pinion meshing therewith, the beveled pinions including nested shafts, a cage-type roller journal bearing supporting the inner pinion shaft within the outer shaft at the pinion end of the latter, a combination double roller thrust and radial bearing supporting the inner pinion shaft within the outer shaft adjacent the forward end and transmitting thrust in both directions, axially spaced clutch elements on the forward ends of the respective pinion shafts and provided with uniform series of external circumferential clutch teeth, and a sliding clutch member selectively engageable with said clutch elements and arranged and adapted for constant rotation with the vehicle propeller shaft, the low speed gear set adapted to be driven by the propeller shaft in direct engine drive relation for speeds up to about 35 M. P. H. with the engine developing approximately its highest torque delivery at all speeds.

2. A two speed axle construction for high speed passenger vehicles and the like, comprising a pair of bevel ring gears and a pair of coaxial, bevel pinions constantly meshing with the respective ring gears, clutch elements for each bevel pinion, a sliding clutch rotatable with a vehicle propeller shaft and selectively engageable with said clutch elements and a permanent multipolar magnetic synchronizer fixed with the clutch element of the smaller pinion for influencing the sliding clutch member and vehicle propeller shaft to the rotating speed of the small pinion when said sliding clutch member and shaft are free turning and the teeth of the sliding clutch are in closest proximity to the said magnetic synchronizer.

3. A two speed axle for the axle housing of a modern high speed passenger car including a center housing of conventionally limited diameter comprising two differential ring gears of different diameter operable within the center housing, a carrier housing mounted on the center housing and having a relatively slender cylindrical forward portion, a pair of nested shafts having integral pinions at the rear ends meshing with the ring gears and forming with the latter high and low speed axle gear sets, said gear sets having a ratio spread of around 100 per cent, the exterior of the inner shaft adjacent its pinion and the interior of the pinion of the outer shaft forming inner and outer bearing races, a heavy cage type roller journal bearing between said races, the outer pinion shaft having a counterbore in its forward end, a combined radial and double roller thrust bearing unit in said counterbore and supporting the inner shaft for thrust in both directions, external clutch elements of uniform diameter on the forward ends of the respective shafts and extending forwardly beyond the cylindrical portion of the carrier housing, and a multipolar permanent magnetic ring fixed to rotate with the inner shaft intermediate said clutch elements, and a slidable clutch element adapted with a single internal series of clutch teeth for selective engagement with the respective pinion clutch elements, the magnetic ring adapted to synchronize said slidable clutch element with the inner pinion shaft as the last mentioned clutch element is moved toward engagement therewith.

4. A pinion shaft structure for a two speed axle of the passenger car type comprising a carrier housing having a cylindrical forward portion, a pair of nested pinion shafts having integral pinions at the rear end, a cylindrical shoulder on the inner shaft extending from the pinion forwardly, a cage-type roller journal bearing operating on said shoulder as an inner race, the inside of the outer shaft and its pinion serving as an outer race, the outer shaft having an enlarged axial counterbore in its forward end, a combined radial and double end thrust roller bearing having inner and outer races seated against said counterbore in the outer shaft and the end of the cylindrical shoulder on the inner shaft respectively, means for securing said races to the respective shafts, and a pair of opposed angle roller bearings mounted at opposite ends of the said cylindrical portion and mounting the outer shaft for end thrust in both directions.

5. In a two speed axle of the passenger car type the combination of a carrier housing having a tubular forward end portion, a pair of opposed angle roller bearings seated in the opposed ends of said cylindrical portion, a pair of nested shafts extending entirely through said cylindrical portion and having integral pinions on the rear ends, the outer of the nested shafts supported for end thrust in both directions on said angle roller bearings, the forward end of the said outer shaft having an external circumferential series of clutch teeth, said forward end of said shaft having an axially extending stepped counterbore, a combined radial and double end thrust bearing supporting the forward end of the inner shaft in the forward end of the outer shaft for end thrust in both directions, a clutch element on the inner shaft at the forward end thereof and retaining the said double roller bearing, the said clutch element having a series of external circumferential clutch teeth similar to those on the outer shaft and axially spaced therefrom, a permanent multipolar magnetic ring, concentric with the clutch member on the inner shaft, nonmagnetic members supporting said ring for rotation with the last mentioned clutch member, a sliding clutch sleeve having a single series of internal clutch teeth and adapted for selective movement across the periphery of the ring into selective engagement with the clutch members on said nested shafts, the ring being beveled on the face thereof closest the clutch teeth on the outer shaft, a pair of bevel pinions formed integrally on the rear ends of said nested shafts, and a cage type journal roller bearing interposed between the nested shafts at the pinion ends thereof and having the internal wall of the outer shaft and the outer wall of the inner shaft serving respectively as races for the roller journal bearing.

6. In a two speed axle of the passenger car type, a pair of nested pinion shafts, integral bevel pinions on the rear ends of the shafts, a pair of bevel ring gears meshing with said pinions, and forming with them a pair of selective axle transmission gear sets having a ratio spread of the order of around 100% between them, a free floating cage type journal roller bearing between the shafts at the pinion ends and supported on the opposed adjacent circumferential walls of said shafts, means to mount the outer shaft for end thrust in both directions, means comprising a combined radial and double thrust angle roller bearing supporting the forward end of the inner shaft within the outer shaft, uniform external circumferential clutch members on both shafts, and in axially spaced relation, a shiftable clutch member having a single series of internal clutch teeth selectively engageable with the clutch members on said shafts, a permanent magnetic multipolar ring intermediate the clutch members and having a cylindrical portion relatively closer to the clutch member on the inner shaft, and nonmagnetic means rigidly supporting the ring concentrically on the inner shaft and intermediate the respective nested clutch members on the respective nested shafts, said ring having an external cylindrical portion providing a minimum airgap between it and the teeth of the shiftable clutch element, the rear end of said ring being beveled and providing an increasing magnetic attraction for the teeth of the sliding clutch as said teeth are moved out of mesh with the clutch member on the outer shaft whereby the sliding clutch is influenced to free rotating speed in synchronism with said ring and the clutch member on the inner shaft.

7. A two speed axle construction for a modern high speed passenger car including a center housing of approximately conventionally limited diameter and comprising a pair of differential ring gears of different diameter, a carrier housing element adapted at its rear end for connection directly to the center housing for enclosing the ring gears therein and having an integral cylindrical forward end, a pair of nested pinion shafts extending through the cylindrical end of the carrier housing and provided with integral bevel pinions meshing respectively with the bevel gears and forming therewith a high speed axle gear set and a low speed axle gear set having a gear ratio spread of the order of 100% between them, opposed angle roller bearings in the ends of the cylindrical portion supporting the outer high speed pinion shaft for end thrust in both directions, a cage type roller journal bearing supporting the rear end of the inner pinion shaft within the pinion end of said outer shaft, said outer shaft having in its forward end a shouldered counterbore, a combined radial and double roller end thrust bearing in said counterbore supporting the inner shaft on the outer shaft, uniform external clutch elements for the respective shafts on the forward ends thereof and in axially spaced relation, a slidable clutch member adapted for rotation with a vehicle propeller shaft and having a single series of internal clutch teeth and shiftable in opposite directions from a netural position intermediate said external clutch elements into selective engagement with the latter, a multipolar permanent magnetic ring disposed between the clutch members and fixed in non-magnetic continuity for rotation with the low speed pinion shaft whereby the teeth of the slidable clutch are magnetically influenced in neutral position to synchronized rotation with the low speed pinion shaft, and means for shifting the slidable clutch member.

8. A synchronizing selective drive mechanism comprising coaxial shafts, driven clutch members on the shafts and spaced from each other, a drive clutch element of magnetic metal adapted to assume a neutral position between the driven clutch members and axially shiftable for selective engagement therewith, a multipolar permanent magnetic ring disposed between the driven clutch members, non-magnetic means connecting the ring for rotation with one of the driven clutch members and serving to position said ring for exerting magnetic influence on the drive clutch element when the latter is in neutral position tending to synchronize rotation of the drive clutch with said ring, and its connected clutch member.

9. In a device of the class described a high speed clutch member, an axially spaced concentric low speed clutch member, drive clutch element comprising a series of internal teeth of magnetic metal shiftable from a neutral position between said clutch members into selective engagement therewith, a permanent multipolar magnetic ring having a cylindrical end adjacent the low speed clutch member and a tapered end adjacent the high speed clutch member, non-magnetic means supporting the ring in the neutral space between the clutch members and fixing said ring for rotation with the low speed clutch member, and means to shift said drive clutch element.

10. In a two speed axle of the passenger car type a high and low speed axle gear set comprising nested pinion shafts, the gear sets having a wide ratio spread between them, an external toothed clutch member on each shaft, a cup-shaped drive clutch adapted for power and free turning rotation with a vehicle propeller shaft and having an internal series of teeth of magnetic metal adapted to shift with said drive clutch into selective engagement with said clutch members, a multipolar permanent magnetic ring disposed in the space between the clutch members, non-magnetic means supporting said ring for rotation with the low speed clutch member, the ring having a cylindrical portion adjacent the last mentioned clutch member and a conical tapered end directed toward the high speed clutch member whereby an increasing magnetic attraction between the poles of the ring and the teeth of the drive clutch occurs as the drive clutch is shifted from the high speed clutch member to the neutral position between the clutch members, and means for shifting the drive clutch.

VICTOR E. MURRAY.

REFERENCES CITED

The following references are of record in the file of this patent:

UNITED STATES PATENTS

| Number | Name | Date |
| --- | --- | --- |
| 1,139,078 | Schwarze | May 11, 1915 |
| 1,209,330 | Pleukharp | Dec. 19, 1916 |
| 2,138,065 | Layman | Nov. 29, 1938 |
| 2,306,643 | Sewell | Dec. 29, 1942 |

FOREIGN PATENTS

| Number | Country | Date |
| --- | --- | --- |
| 297,594 | Italy | June 16, 1932 |